(12) United States Patent
Neher

(10) Patent No.: US 6,388,612 B1
(45) Date of Patent: May 14, 2002

(54) GLOBAL CELLULAR POSITION TRACKING DEVICE

(76) Inventor: Timothy J Neher, 411 Hobron La., No. 3204, Honolulu, HI (US) 96815

(*) Notice: Subject to any disclaimer, the term of this patent is extended or adjusted under 35 U.S.C. 154(b) by 0 days.

(21) Appl. No.: 09/536,009

(22) Filed: Mar. 26, 2000

(51) Int. Cl.$^7$ ................................................. G01S 5/02
(52) U.S. Cl. .................. 342/357.07; 370/312; 370/313; 63/3.1; 63/7; 224/164
(58) Field of Search ....................... 342/357.07, 357.09, 342/357.1; 370/312, 313, 479; 63/3.1, 7, 11, 15.3; 224/164; D10/32; D11/87

(56) References Cited

U.S. PATENT DOCUMENTS

| | | | |
|---|---|---|---|
| 5,014,040 A | * 5/1991 | Weaver | ....................... 340/572 |
| 5,289,163 A | 2/1994 | Perez et al. | |
| 5,461,365 A | 10/1995 | Schlager et al. | |
| 5,461,390 A | 10/1995 | Hoshen | |
| 5,576,952 A | 11/1996 | Stutman et al. | |
| 5,617,074 A | 4/1997 | White | |
| 5,627,548 A | 5/1997 | Woo et al. | |
| 5,731,757 A | * 3/1998 | Layson, Jr. | .................. 340/573 |
| 5,731,785 A | * 3/1998 | Lemelson et al. | ..... 342/357.07 |
| 5,734,981 A | 3/1998 | Kennddy, III et al. | |
| 5,742,233 A | 4/1998 | Hoffman et al. | |
| 5,748,148 A | 5/1998 | Heiser et al. | |
| 5,905,461 A | 5/1999 | Neher | |
| 6,121,922 A | * 9/2000 | Mohan | ..................... 342/357.1 |
| 6,243,039 B1 | * 6/2001 | Elliot | .......................... 342/457 |

* cited by examiner

*Primary Examiner*—Thomas H. Tarcza
*Assistant Examiner*—Fred H Mull
(74) *Attorney, Agent, or Firm*—Michael I. Kroll (57) ABSTRACT

A global positioning and tracking system for locating objects including a plurality of tracking devices each releasably secured to an object and a central monitoring station. Each tracking device includes a processing device for storing an identification code unique to the tracking device, determining a location of the tracking device and generating a position signal based upon the determined location, a cellular transmitter/receiver for receiving and initiating cellular transmissions. The central monitoring station receives a location request and identification code from a user and initiates a cellular transmission including the identification code to a telephone number assigned to the tracking units. Upon receipt of the cellular transmission each tracking unit compares the identification code with its stored identification code. The tracking unit with a stored identification code determined to match the received identification code generates and transmits a position signal to the central monitoring station via cellular transmission channels. The central monitoring station then relays the position signal to the user. The user is able to provide a location request to the central monitoring station by at least one of a telephone communication and an electronic message via an Internet connection. Each tracking device is also able to generate a distress signal for transmission to the central monitoring unit upon detection of an emergency situation or automatically upon breaking of the circuit of the tracking unit.

11 Claims, 12 Drawing Sheets

GLOBAL CELLULAR POSITION TRACKING DEVICE

BACKGROUND OF THE INVENTION

FIELD OF THE INVENTION

The present invention relates generally to tracking systems and, more specifically, to a global positioning tracking system for locating the position of a person or item anywhere anytime.

DESCRIPTION OF THE PRIOR ART

Numerous tracking systems have been provided in the prior art. For example, U.S. Pat. Nos. 5,289,163; 5,461,365; 5,461,390; 5,617,074 and 5,627,548 all are illustrative of such prior art. While these units may be suitable for the particular purpose to which they address, they would not be as suitable for the purposes of the present invention as heretofore described.

U.S. Pat. No. 5,289,163

Inventor: Carla D. Perez et al.

Issued: Feb. 22, 1994

A child position monitoring device monitors the position of a child by detecting the signal strength of a radio frequency carrier from a transmitter attached to the child. If the signal of the radio frequency carrier is too weak, the child is to far away from the adult who has the child position monitoring device. When this happens, the adult is informed that the child has wandered too far away through the use of an audio tone or through the use of vibrations coming from the device. Once the adult is notified that the child is too far away, the device also has a locating display for indicating the relative direction of the child with respect to the adult. The display uses eight LEDs arranged around an emblem used to represent the position of the adult. The LED which lights up indicates the relative direction of the child.

U.S. Pat. No. 5,461,365

Inventor: Dan Schlager et al.

Issued: Oct. 24, 1995

A personal alarm system includes a monitoring base station and one or more remote sensing units in two-way radio communication. An electronic handshake between the base station and each remote unit is used to assure system reliability. The remote units transmit at selectable power levels. In the absence of an emergency, a remote unit transmits at a power-conserving low power level. Received field strength is measured to determine whether a remote unit has moved beyond a predetermined distance from the base station. If the distance is exceeded, the remote unit transmits at a higher power level. The remote unit includes sensors for common hazards including water immersion, smoke, excessive heat, excessive carbon monoxide concentration, and electrical shock. The base station periodically polls the remote units and displays the status of the environmental sensors. The system is useful in child monitoring, for use with invalids, and with employees involved in activities which expose them to environmental risk. Alternative embodiments include a panic button on the remote unit for summoning help, and an audible beacon on the remote unit which can be activated from the base station and useful for locating strayed children. In another embodiment, the remote unit includes a Global Positioning System receiver providing location information for display by the base station.

U.S. Pat. No. 5,461,390

Inventor: Joseph Hoshen

Issued: Oct. 24, 1995

A locator device for monitoring the location of subjects, usable in conjunction with a database system causes a polling signal to be sent periodically to each of the subject's locator devices in the area. The locator device includes a wireless transceiver to receive the polling message and, in response, query a location determination device for the current location of the device. This location is then sent back through the wireless network to the database. The database determines from a record on that particular subject where that subject is supposed to be at that time. If the subject being monitored is not within the area where he or she is supposed to be, then the database may automatically contact law enforcement officials.

U.S. Pat. No. 5,617,074

Inventor: Marvin D. White

Issued: Apr. 1, 1997

A child finder basically consists of a transmitter which is concealingly attachable to a child's body and which sends a signal to a conventional receiver so that the child's location can be continually monitored. The transmitter will typically be carried in an article of jewelry, such as a watch, bracelet, ring, or the like, and will use a special on/off switch which allows the transmitter to be activated only when the jewelry is being worn by the child. The switch includes a reciprocal push button which closes the transmitter's electrical circuit when depressed, and the button is spring-biasedly moved away from electrical contact with the transmitter's circuit when the article of jewelry is not being worn. To protect against inadvertent partial movement of the button which could break electrical contact thus deactivating the transmitter an electrical contact surface of the button is provided with an upwardly extending electrically conductive spring finger which maintains continual electrical contact irrespective of temporary and inadvertent reciprocal movement of the spring finger recedes into a provided groove on the electrical contact surface of the button so as to prevent the finger from causing interference between the primary electrical contact surfaces.

U.S. Pat. No. 5,627,548

Inventor: Arthur N. Woo et al.

Issued: May 6, 1997

A navigation wrist wear device comprises a GPS receiver fully disposed in a wrist watch type housing. A transparent microwave patch antenna is patterned of indium-tin-oxide on sapphire in front of an LCD time, position and velocity display. A bezel provides a protective window. A low-noise amplifier, down conversion, code processing and navigation processing are all provided on a single integrated circuit. Photovoltaic solar cells to each side of the LCD help keep a battery charged.

SUMMARY OF THE PRESENT INVENTION

The present invention relates generally to tracking systems and, more specifically, to a global positioning tracking system for locating the position of a person or item anywhere at anytime.

A primary object of the present invention is to provide a global positioning and tracking system that will overcome the shortcomings of prior art devices.

Another object of the present invention is to provide a global positioning and tracking system which is able to locate individuals and personal property anywhere around the world.

An additional object of the present invention is to provide a global positioning and tracking system including a transmitter/receiver for attachment around an individuals wrist or ankle or to an item of personal property.

A still further object of the present invention is to provide a global positioning and tracking system that is operable in both a normal and standby mode.

An even further object of the present invention is to provide a global positioning and tracking system including a remote transmitter/receiver within a band made of a cut resistant material thereby making removal of the device from the object to which it is attached difficult.

A still further object of the present invention is to provide a global positioning and tracking system wherein the cut resistant material forming the band is at least one of a high tensile strength plastic fiber and stainless steel, wherein the material is able to retain its cut resistant qualities while remaining small, attractive to wear and of a thickness which is not burdensome to the wearer.

A still further object of the present invention is to provide a global positioning and tracking system including a band having an identification code unique to the particular band.

A yet further object of the present invention is to provide a global positioning and tracking system including an emergency activation button for alerting a main station as to the existence of a location of an emergency situation.

A still further object of the present invention is to provide a global positioning and tracking system able to utilize a wireless telephone transmission for communicating with the central station.

An even further object of the present invention is to provide a global positioning and tracking system wherein each band is able to receive a cellular telephone transmission from the central station and reply thereto with a position signal.

A yet further object of the present invention is to provide a global positioning and tracking system able to utilize existing cellular telephone technology to provide communication between the central monitoring unit and tracking units.

A still further object of the present invention is to provide a global positioning and tracking system able to receive requests by individuals over telephone lines and Internet connections as to the location of particular tracking units.

Another object of the present invention is to provide a global positioning and tracking system that is simple and easy to use.

A still further object of the present invention is to provide a global positioning and tracking system that is economical in cost to manufacture.

Additional objects of the present invention will appear as the description proceeds.

A global positioning and tracking system for locating objects including a plurality of tracking devices each releasably secured to an object and a central monitoring station is disclosed by the present invention. Each tracking device includes a processing device for storing an identification code unique to the tracking device, determining a location of the tracking device and generating a position signal based upon the determined location, and a cellular transmitter/receiver for receiving and initiating cellular transmissions. The central monitoring station receives a location request and identification code from a user and initiates a cellular transmission including the identification code to a telephone number assigned to the tracking units. Upon receipt of the cellular transmission each tracking unit compares the identification code with its stored identification code. The tracking unit with a stored identification code determined to match the received identification code generates and transmits a position signal including information regarding the power level of the tracking unit to the central monitoring station via cellular transmission channels. The central monitoring station then relays the position signal to the user. The user is able to provide a location request to the central monitoring station by at least one of a telephone communication and an electronic message via an Internet connection. Each tracking device is also able to generate a distress signal for transmission to the central monitoring unit upon detection of an emergency situation or automatically upon breaking of the circuit of the tracking unit. Once a location request signal is received for a particular tracking unit, the central monitoring station will continue to track the particular tracking unit by continuously transmitting a location request signal to the tracking unit. The frequency at which the location signals are transmitted is dependent upon the power level of the tracking unit so as to maximize use of the power stored in the tracking unit and prevent failure of the tracking unit due to drainage of the power supply.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the global position and tracking system of the present invention. With regard to the reference numerals used, the following numbering is used throughout the various drawing figures.

10 global positioning and tracking system of the present invention
12 central monitoring station of the global positioning and tracking system of the present invention
14 tracking satellite of the global positioning and tracking system of the present invention
16 local transmitter/receiver station of the global positioning and tracking system of the present invention
18 wristband/tracking unit of the global positioning and tracking system of the present invention
20 child wearing tracking device of the global positioning and tracking system of the present invention
22 guardian of child
24 line indicating transmission of location signal between tracking unit and relay station
26 line indicating transmission of location signal between relay station and tracking satellite
28 line indicating transmission of location signal between relay station and central monitoring station
30 line indicating transmission of location signal between tracking satellite and central monitoring station
32 wrist of user wearing tracking unit
34 smooth outer surface of tracking unit
36 face plate of tracking unit for engraving decorative or identification information thereon
38 locking mechanism
40 first shaft within first side of tracking unit
42 second shaft within first side of tracking unit
44 first side of tracking unit
46 second side of tracking unit
48 first prong extending from second side of tracking unit
50 second prong extending from second side of tracking unit
52 teeth on first prong
54 teeth on second prong
56 slide switch for transmitting distress signal
58 first position of slide switch
60 second position of slide switch
62 hinge
64 inner side of tracking unit
66 logic circuit within inner side of tracking unit
68 band of the tracking unit
70 transmission wire
72 first section of transmission wire
74 second section of transmission wire
76 first end of first section of transmission wire
78 second end of first section of transmission wire
80 first end of second section of transmission wire
82 second end of second section of transmission wire
84 microprocessor/logic device
86 power supply
88 memory
90 programmable EPROM
92 GPS logic circuit
94 input port connector
96 transmitter
98 emergency button
100 second embodiment of the global positioning and tracking system of the present invention
102 central monitoring station
104 tracking unit
106 line indicating telephone signal
108 person placing telephone call
110 cellular telephone
114 conventional telephone lines
116 person using computer to send electronic message
118 computer used to send electronic message
120 arrow identifying telephone transmission from central monitoring unit to relay unit
122 relay unit
124 arrow identifying transmission from central monitoring unit to satellite
126 satellite
128 arrow identifying telephone transmission from satellite to relay unit
130 arrow identifying telephone transmission from relay unit to tracking unit
132 arrow identifying telephone transmission from tracking unit to satellite
134 arrow identifying telephone transmission from relay unit to central monitoring unit
136 arrow identifying telephone transmission from relay unit to satellite
138 arrow identifying telephone transmission from satellite to central monitoring unit
140 cellular transmitter
142 cellular receiver
144 arrow indicating emergency signal transmitted to public service answering point nearest location of tracking unit
146 public service answering point
148 power level sensor

DETAILED DESCRIPTION OF THE PREFERRED EMBODIMENT

Turning now descriptively to the drawings, in which similar reference characters denote similar elements throughout the several views, FIGS. 1 through 6 illustrate a first embodiment of the global positioning and tracking system of the present invention indicated generally by the numeral 10.

Figure 1:
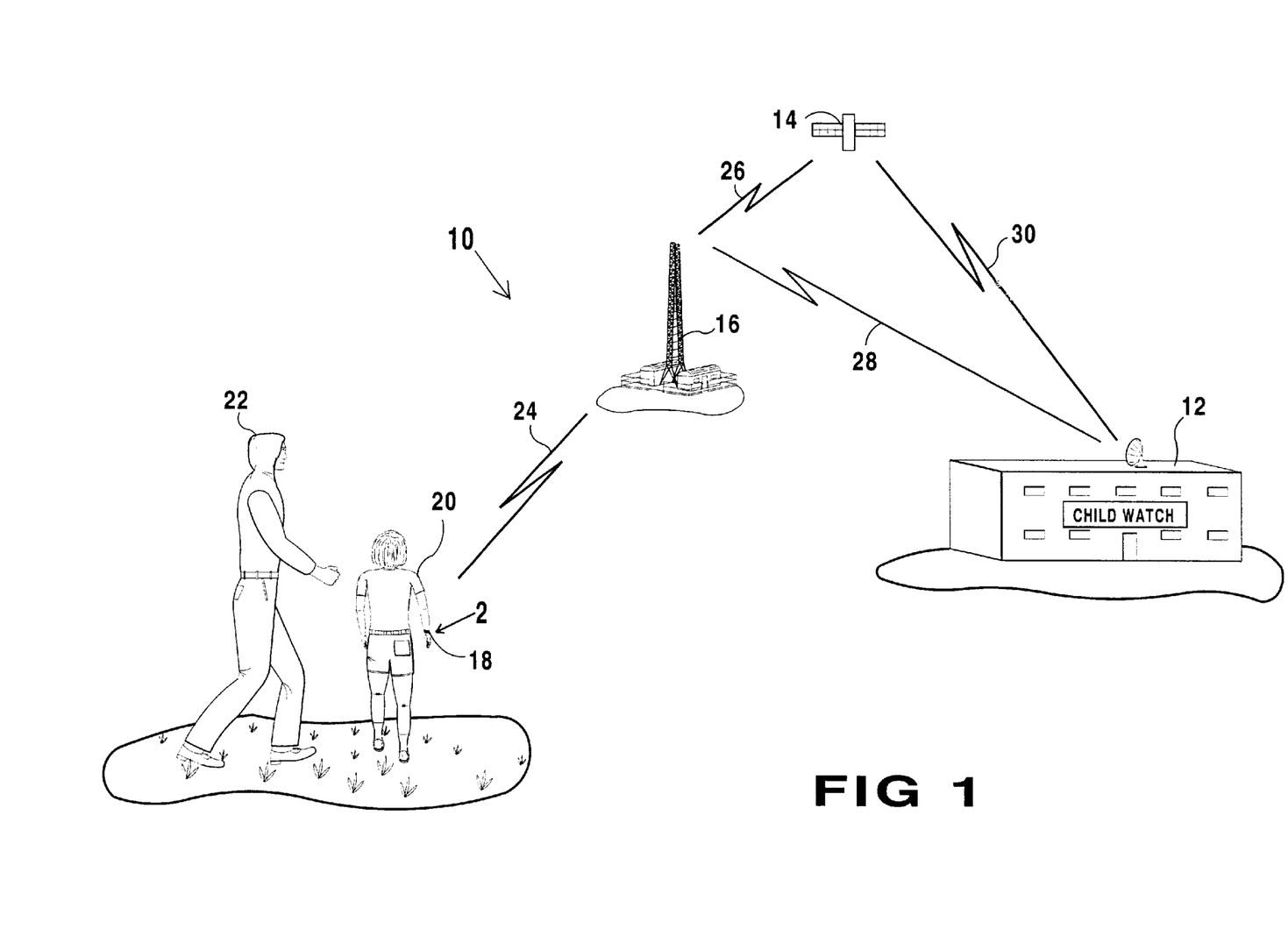
FIG. 1 is a perspective view of the global positioning and tracking system of the present invention used for tracking the location of a child.

The global positioning and tracking system 10 is illustrated in FIG. 1 and includes a central monitoring station 12, a tracking satellite 14, a local relay station 16 and a wristband/tracking unit 18. The central monitoring station 12 monitors all movements of an activated tracking unit 18. The tracking unit 18 is attached to an item of personal property or to an individual such as a child 20 as illustrated in FIG. 1. The child 20 in the figure is being watched by a guardian 22 and being tracked by the global positioning and tracking system 10. When the tracking unit 18 is activated by the user 20 or the guardian 22 of the person or item being tracked, the tracking unit 18 will transmit both an identification signal and a location signal to a nearby relay station 16 as is indicated by the line labeled 24. The location signal 24 may also include an identification code for the tracking unit 18 which will be compared to a data base of valid identification codes indicative of all possible tracking units at the relay station 16. If the location signal 24 is determined to be valid, the relay station 16 will transmit the received signal to either the tracking satellite 14 as indicated by the line labeled 26 or to a central monitoring station 12 as indicated by the line labeled 28. The location signal will be transmitted directly to the central monitoring station 12 if the relay station 16 is located within a predetermined distance from the central monitoring station 12. If the location signal is transmitted to the tracking satellite 14, the tracking satellite 14 will relay the signal to the central monitoring station 12 as is indicated by the line labeled 30. The signal received at the central monitoring unit 12 is then monitored to keep track of the position of the tracking unit 18 anywhere in the world. The extent of usefulness of the system 10 is based upon the range within which the tracking units 18 can transmit signals and the number of relay stations 16 positioned throughout the world to cover all areas in which a tracking unit 18 may be located.

Figure 2:
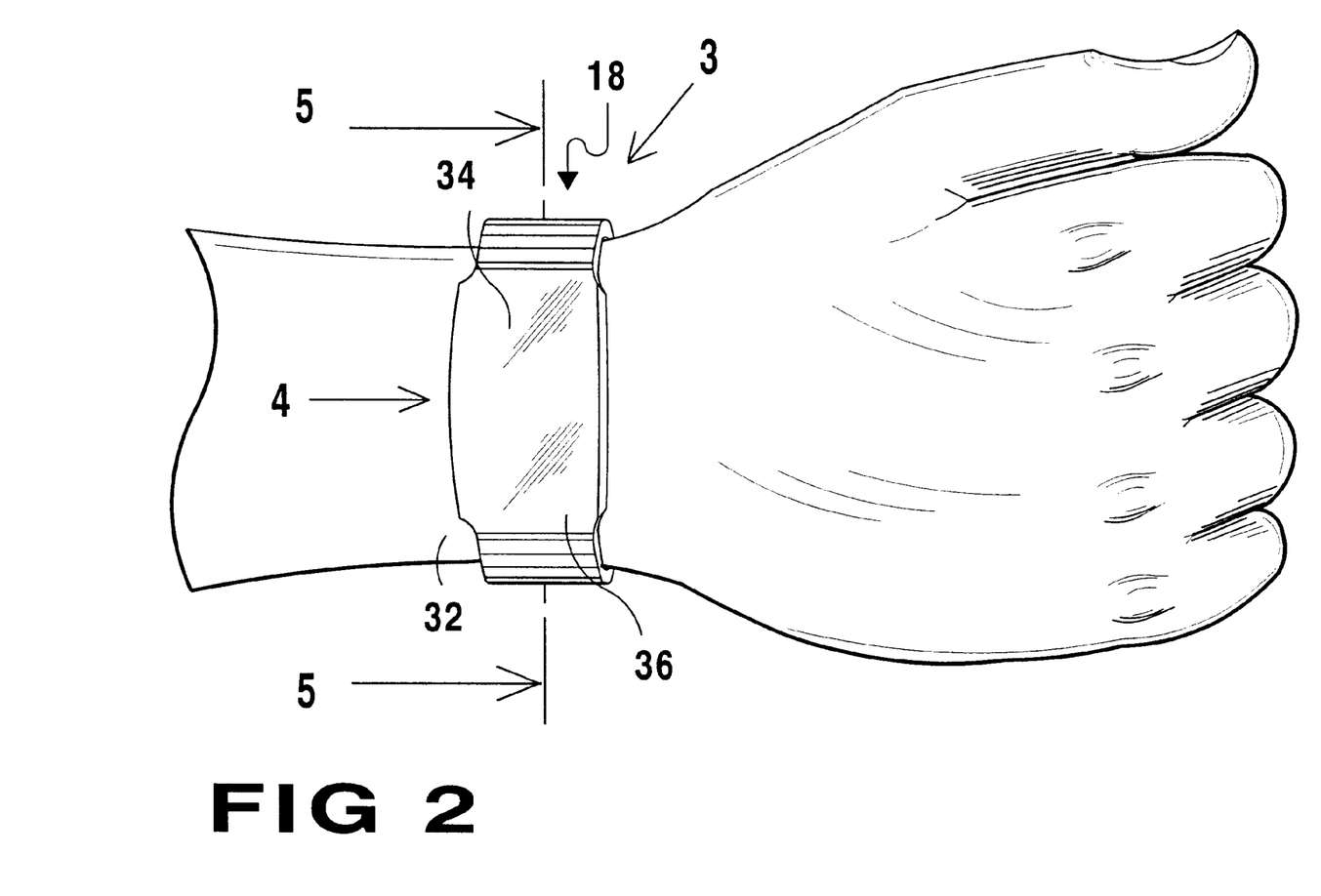
FIG. 2 is a perspective top view of a wristband used with the global positioning and tracking system of the present invention worn by a user whose position is to be tracked.

An exemplary embodiment of a tracking unit 18 is illustrated in FIGS. 2–5. FIG. 2 illustrates the tracking unit 18 connected about the wrist 32 of a user 20. The tracking unit 18 includes an outer surface 34 having a smooth texture. The tracking unit 18 may also include a face plate 36 which may be engraved with a child's name, a decoration to detract from the purpose of the device providing an ornamental feature to the device or even any other type of identification code. The tracking unit 18 is preferably made of a cut resistant material so that it is difficult or even impossible to remove without the proper unlocking mechanism. Preferred materials for use in manufacturing the tracking unit 18 are high tensile strength plastic fiber and stainless steel which will prevent cutting of the tracking unit 18 with conventional cutting devices such as scissors, knives, hacksaws, bolt cutters, etc. Furthermore, the tracking unit is able to retain its cut resistant qualities while remaining small, attractive to wear and of a thickness which is not burdensome to the wearer. Thus, the tracking unit 18 can be used without worry for tracking the location of a child, a prisoner or inmate out on a work release program or furlough, senior citizens in need of medical care, personal property or even athletes such as hikers or mountain climbers moving through dangerous areas.

Figure 3:
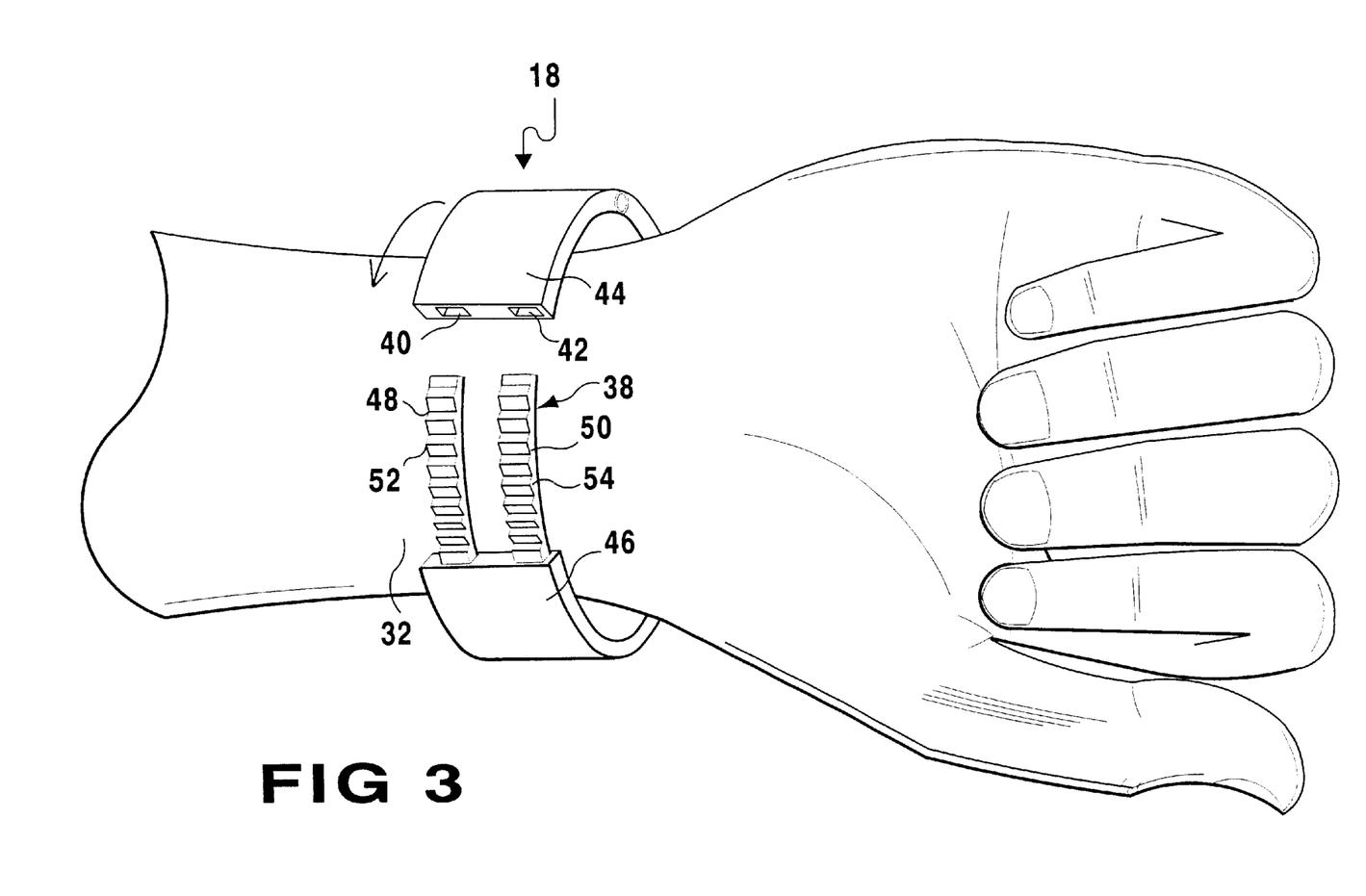
FIG. 3 is a perspective top view of a wristband used with the global positioning and tracking system of the present invention, the wrist band being in an unlocked position.

FIG. 3 illustrates an exemplary locking mechanism 38 for connecting the tracking device 18 about the wrist 32 of the user 20. The locking mechanism 38 includes first and second prong shafts 40 and 42, respectively, on a first side 44 of the tracking unit 18. Extending from a second side 46 of the tracking unit 18 are first and second prongs 48 and 50, respectively. The first and second prongs 48 and 50 each include a top side having teeth 52 and 54 extending along a length thereof In order to lock the tracking device 18 around a wrist 32 of the user 20, the first and second prongs 48 and 50 are inserted into respective ones of the first and second shafts 40 and 42. The teeth 52 and 54 on each of the prongs 48 and 50 releasably engage with the inner side of the respective shafts 40 and 42 for locking the tracking unit 18 closed. The locking mechanism 38 may be provided with a variety of possible locking mechanisms such as keys, combination locks, electronic locks, etc. to prevent the tracking device from being detached from the item or person once attached.

Figure 4:
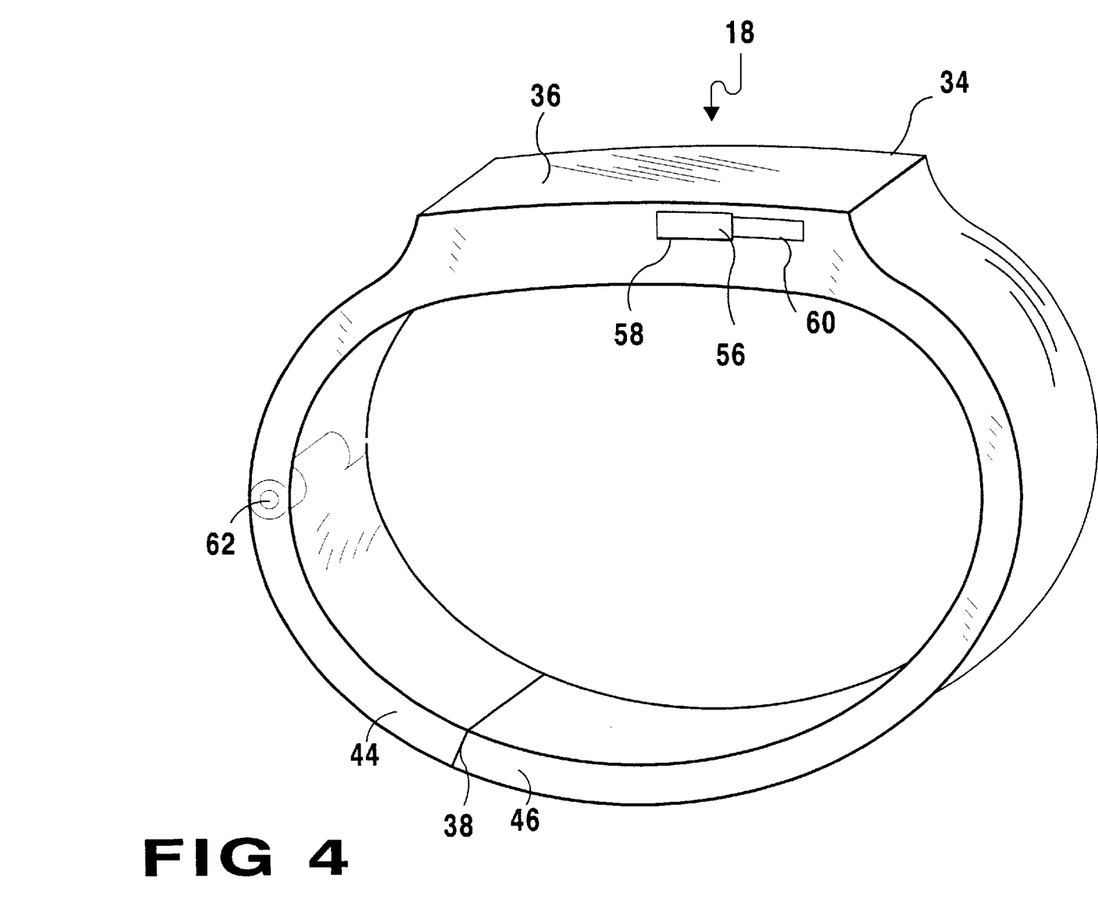
FIG. 4 is a perspective side view of the wristband used with the global positioning and tracking system of the present invention.

FIG. 4 illustrates the tracking unit 18 in an unattached condition, not connected to a user or item of personal property. This view illustrates a slide switch 56 for initiating transmission of a distress signal to the relay station 16 on a side of the unit 18. The slide switch 56 is movable between a first position 58 in which the distress signal is not transmitted and a second position 60 in which the tracking unit 18 is activated for transmitting the distress signal. The distress signal will be continuously transmitted until the user or another person moves the slide switch 56 back to the first position 58. The slide switch 56 must over come a frictional force to move between the first and second positions 58 and 60 and thus will not be unconsciously or unintentionally activated to transmit the distress signal. Also seen from this figure is a hinge 62. As the tracking unit 18 is made of a somewhat rigid inflexible material, the hinge 62 allows the first and second sides 44 and 46 to be separated when the tracking device 18 is either being placed about the wrist of the user or being removed therefrom.

Figure 5:
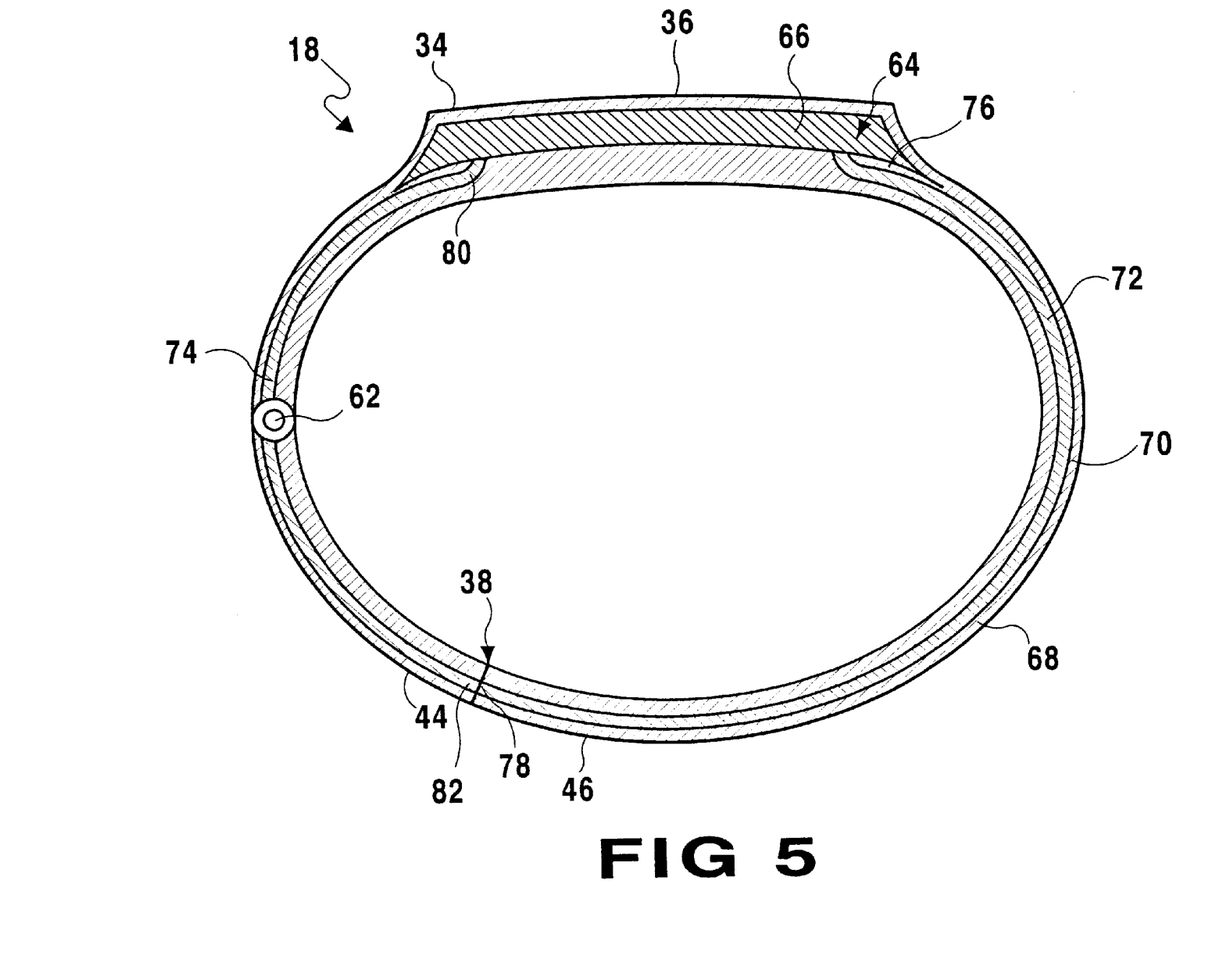
FIG. 5 is a perspective side cross-sectional view of a wristband used with the global positioning and tracking system of the present invention.

A cross-sectional view of the tracking unit 18 is illustrated in FIG. 5. Within an interior 64 of the tracking unit 18 is a logic circuit 66. Extending within a band 68 of the tracking unit 18 is a transmission wire 70. The transmission wire 70 is formed of first and second sections 72 and 74 respectively. The first section 72 includes a first end 76 connected to the logic circuit 66 and a second end 78 extending to the second end 46 of the tracking unit 18. The second section 74 includes a first end 80 connected to the logic circuit 66 and a second end 82 extending to the first end 44 of the tracking unit 18. When the locking mechanism 38 is closed joining the first and second sides 44 and 46, the first and second sections 72 and 74 of the transmission wire 70 are connected to complete a fill circuit with the logic circuit 66. When the circuit is broken such as if the band 68 is cut or the locking mechanism 38 is broken to release the tracking unit 18 from its position, the tracking unit 18 will automatically transmit the distress signal to alert the central monitoring station 12 as to the present situation.

Figure 6:
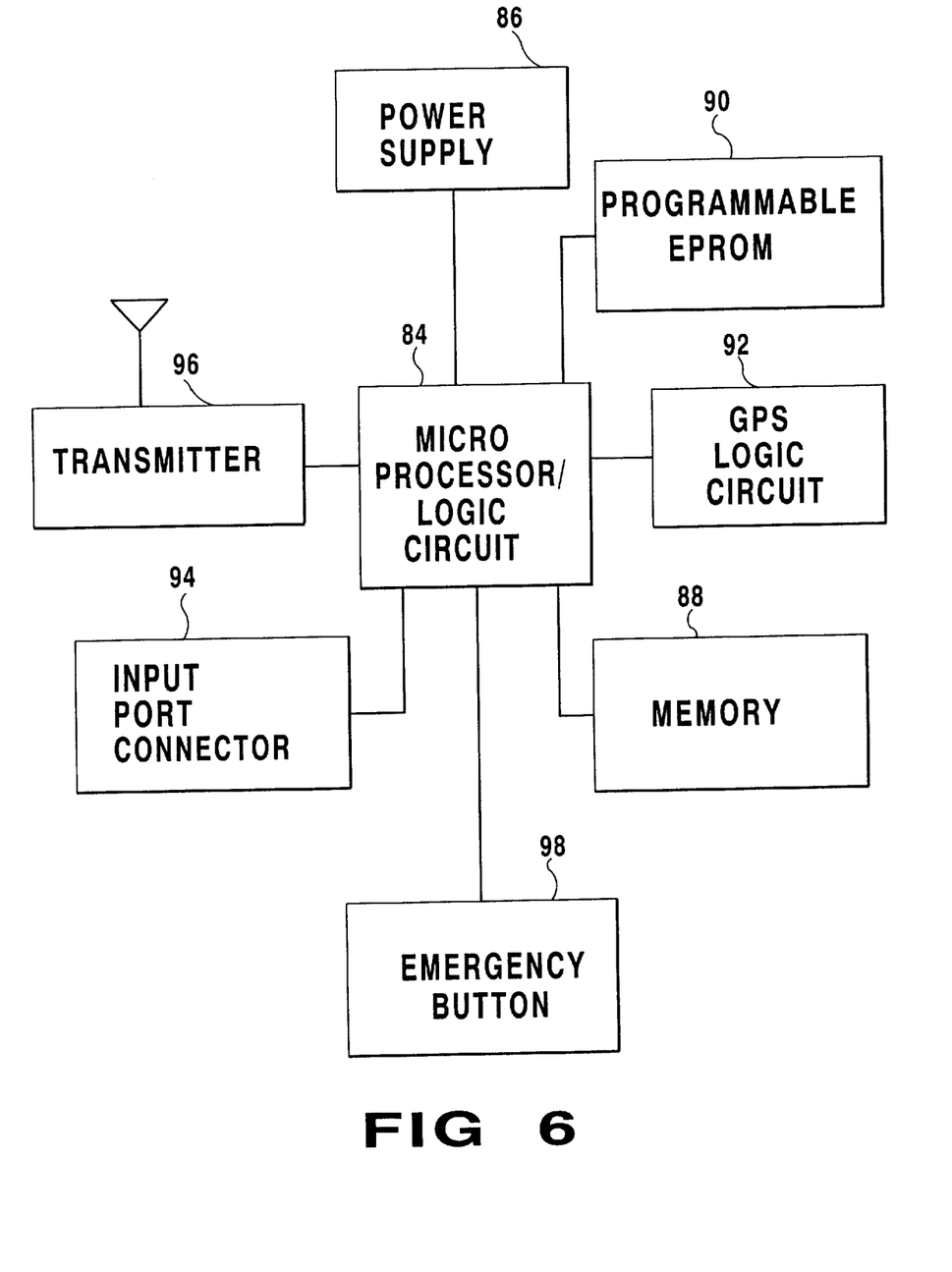
FIG. 6 is a schematic block diagram of the wristband used with the global positioning and tracking system of the present invention.

A schematic block diagram of the tracking unit 18 of the global positioning and tracking system 10 is shown in FIG. 6. As is clearly shown in this figure the tracking unit 18 includes a microprocessor/logic device 84. The microprocessor/logic device 84 is connected to receive operating power from a power supply 86. The power supply 86 may be any type of battery which is small enough to fit within the interior 64 of the tracking device 18 or may even be a solar powered battery for powering the logic circuit. Also connected to the microprocessor/logic device 84 is a memory unit 88 for storing the identification number and distress signal information, a programmable EPROM 90 for storing the operating software for the microprocessor/logic device 84 and a Global Positioning Satellite (GPS) logic circuit 92 for use in calculating the longitudinal, latitudinal and elevational position of the tracking unit 18 for transmission to the microprocessor/logic device 84 and ultimate transmission to the central monitoring station 12. An input port connector 94 is connected to the microprocessor/logic device 84 for use in inputting the identification information for storage in the memory 88. A transmitter 96 is connected to the microprocessor/logic device 84 for transmission of the identification information, GPS information and distress signals to the relay station 16 for ultimate transmission to the central monitoring station 12. An emergency button (slide switch) 98 is also connected to initiate transmission of the distress signal when activated or when the band of the tracking unit is cut or the lock is opened without proper authorization.

Figure 8:
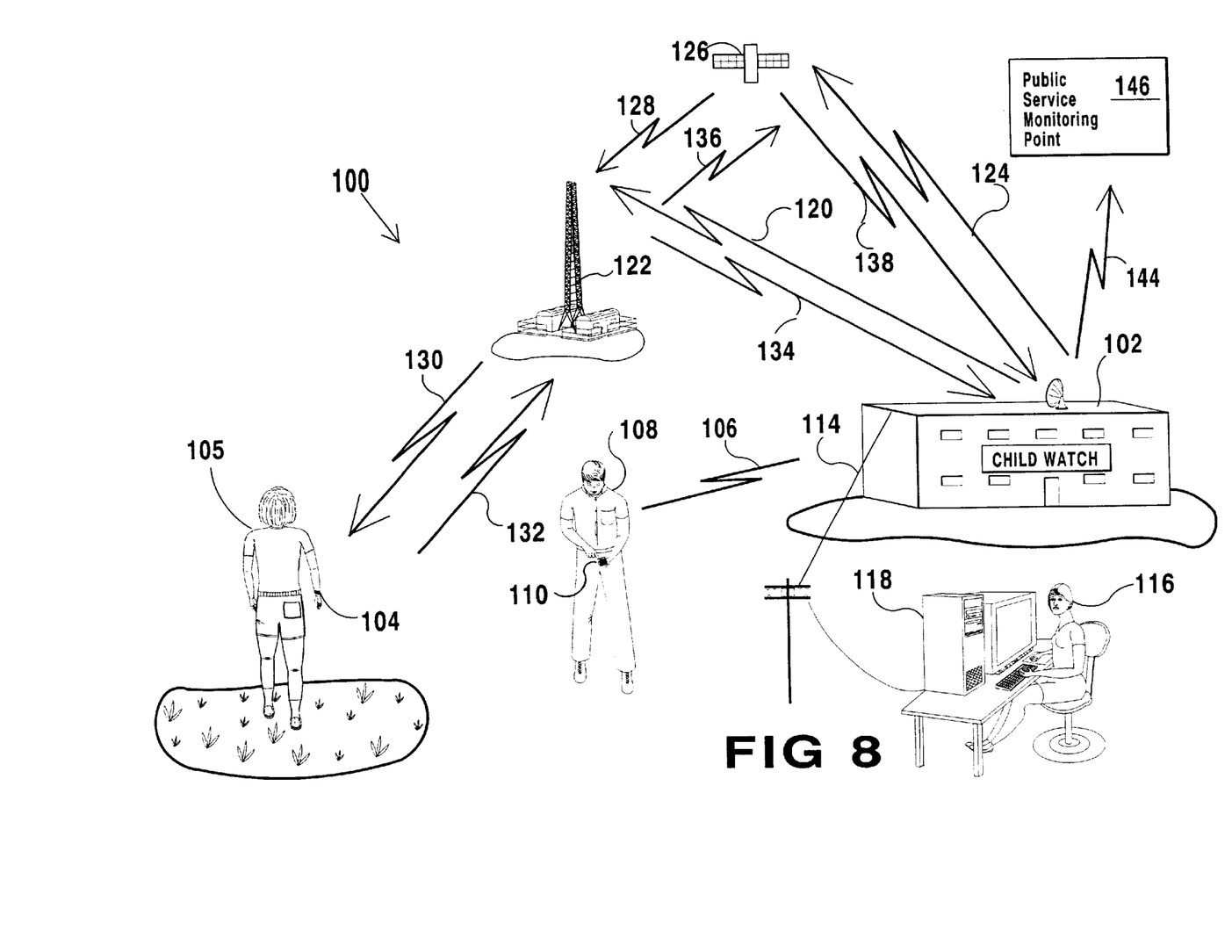
FIG. 8 is a perspective view of the global positioning and tracking system of the present invention used for tracking the location of a child.
Figure 9:
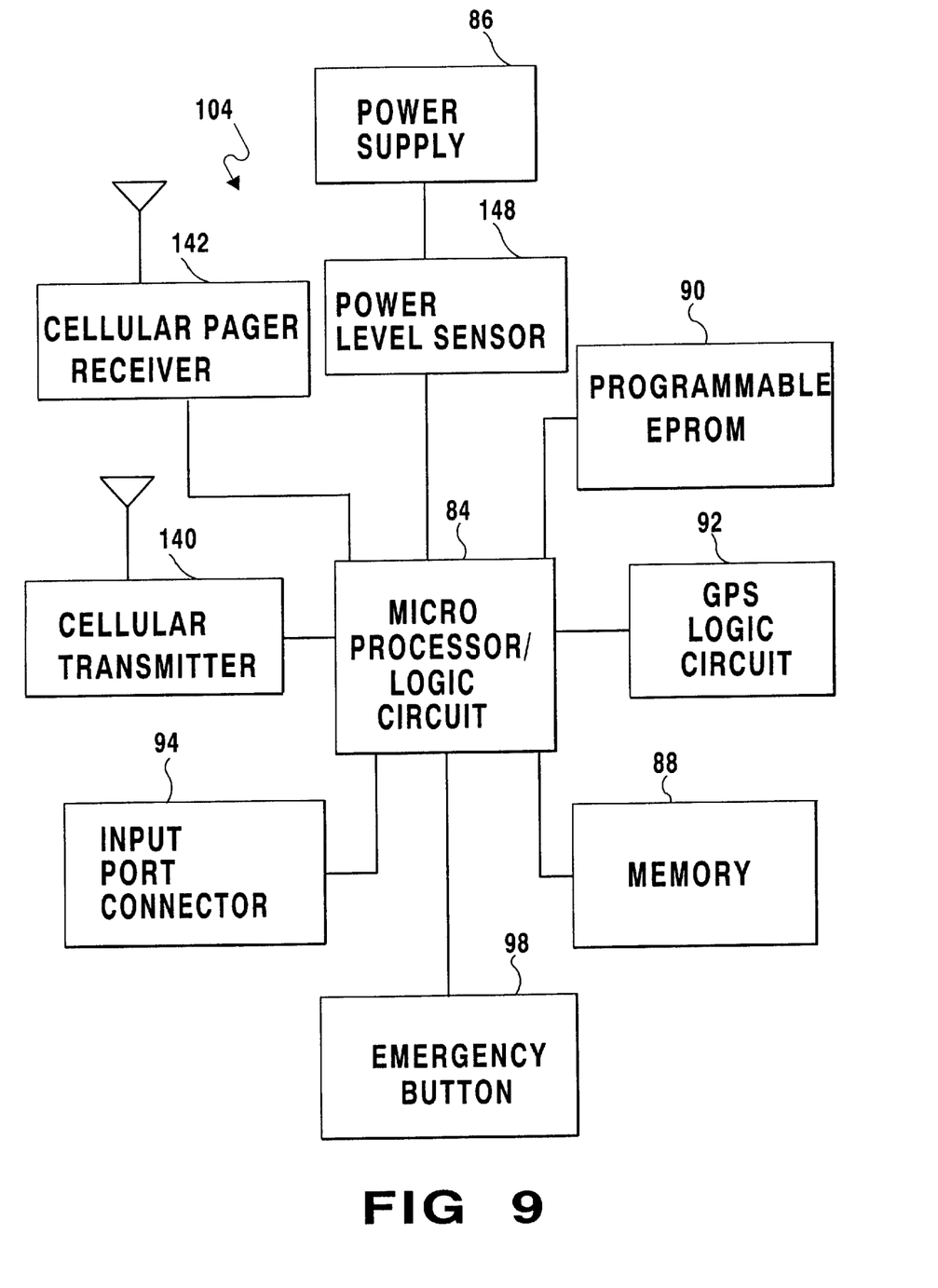
FIG. 9 is a block diagram of the tracking unit used with the global positioning and tracking system shown in FIG. 8.

An alternative embodiment of the global positioning and tracking system is illustrated in FIGS. 8 and 9 and indicated generally by the numeral 100. The global positioning and tracking system 100 includes a central monitoring station 102 and a wristband/tracking unit 104 positioned around a person or object to be monitored. The tracking unit 104 is attached to an item of personal property or to an individual such as a child 105 as illustrated in FIG. 8. The central monitoring station 102 is adapted to receive telephone transmissions 106 from individuals 108 using a telephone 110 or from a user 112 through an Internet connection over a telephone line 114 connected to a computer 116. When contacting the central monitoring station 102, the user 108, 116 will enter an identification code associated with the tracking unit 104 desired to be located.

The central monitoring station 102 will receive the transmission and compare the received identification code with identification codes stored in a database therein. Upon determining the received identification code matches a code stored in the data base, the central monitoring station 102 will transmit a telephone signal indicated by the line labeled 120 to a relay station 122 as used in conventional telephone transmissions. The telephone signal 120 will include the identification code for the tracking unit 104. The telephone signal indicated by the line labeled 124 may also be transmitted to a tracking satellite 126 through satellite communications channels. The tracking satellite 126 will then transmit relay the telephone signal to relay stations 122 as indicated by the line labeled 128 for ultimate transmission to the tracking units 104 as indicated by the line labeled 130. Upon receipt of the telephone signal 130 by the tracking units 104, the tracking units 104 will compare the identification code transmitted therewith with an internal transmission code. Only the tracking unit 104 having an identification code matching the received identification code will respond to the received signal by generation and transmission of a response signal indicated by the line labeled 132 identifying the location of the tracking unit 104 and a power level of the internal power supply. The response signal 132 will be transmitted as a conventional cellular telephone transmission to the relay station 122 and then directly to the central monitoring station 102 as indicated by the arrow labeled with the numeral 134 if the relay station 122 is located within a predetermined distance from the central monitoring station 102. If the location signal 132 is transmitted to the tracking satellite 126 as indicated by the line labeled with the numeral 136, the tracking satellite 126 will relay the signal to the central monitoring station 102 as is indicated by the line labeled 138.

The signal received at the central monitoring unit 102 is then transmitted to the telephone 110 or computer 118 placing the request for the location of the tracking unit 104 thereby informing the person 108, 116 of the location of the tracking unit 104. If the request is placed using a telephone 110, a voice message indicating the location of the tracking unit 104 is transmitted to the person 108. When using a computer 118, the person 116 will enter the web site for the central monitoring station 102 and send an electronic message such as an e-mail to the central monitoring station 102. The central monitoring station 102 will then send an electronic message reply informing the person 116 of the location of the tracking unit 104. The central monitoring station 102 will continue to monitor the position of the tracking unit 104 by continuously transmitting location request signals 120. The frequency of transmission of the location request signals 120 is dependent upon the power level of the power supply within the tracking unit 104. The power level is sensed prior to transmission of the response signal and indicates the strength of the power supply. The tracking unit 104 is normally in an inactive state periodically scanning for location request signals transmitted thereto by the central monitoring station 102 as in a conventional pager device. Upon receipt of the the tracking device must awaken to generate the response signal 132. Generation of the response signal requires a greater amount of power than operation in the inactive state. When the power supply is at a low power level, generation of the response signal may drain the power supply to an inoperative level and thus render the tracking unit 104 inoperative. The central monitoring station will thus, analyze the power level signal received with the response signal and continue to track the tracking unit 104 by transmitting a location request signal at a frequency which will allow the tracking unit 104 to remain operative for the longest amount of time while not inhibiting the ability to track the tracking unit 104.

When an emergency signal is received by the central monitoring station 102, the central monitoring station will also generate a signal indicated by the numeral 144 and including location information regarding the tracking unit 104 which is transmitted to a public service answering point nearest the tracking unit 104. The public service answering unit 146 will be able to dispatch emergency personnel to the location of the tracking unit 104 in response to receipt of the emergency signal 144.

A schematic diagram of the tracking unit 104 used with the global positioning and tracking system 100 is illustrated in FIG. 9. The tracking unit 104 is substantially identical to that illustrated in FIG. 6. However, the tracking unit 104 shown in FIG. 9 includes a cellular telephone transmitter 140 and a cellular pager receiver 142. The cellular telephone transmitter 140 allows the tracking device to transmit cellular telephone calls to the central monitoring station 102 and thus utilize existing cellular technology in transmitting location data. The cellular pager receiver 142 allows the tracking unit 104 to receive the cellular telephone signals transmitted by the central monitoring station 102 in the same manner as a conventional pager and thus allows persons to request information on the location of a tracking unit 104 by simply placing a telephone call. A power level sensor 148 is connected between the power supply 86 and the microprocessor 84 for sensing the power level of the power supply and providing the sensed power level to the microprocessor 84. The microprocessor 84 generates a power level signal to be transmitted with the response signal transmitted by the cellular transmitter 140.

Figure 7:
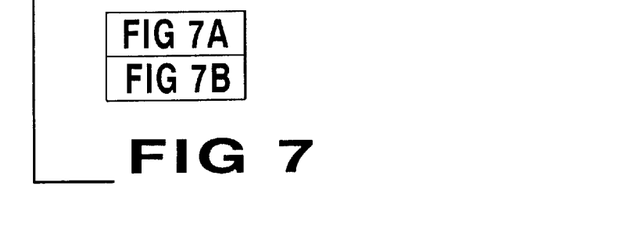
FIG. 7 is a flow chart describing the operating method of the global positioning and tracking system of the present invention.
Figure 7A:
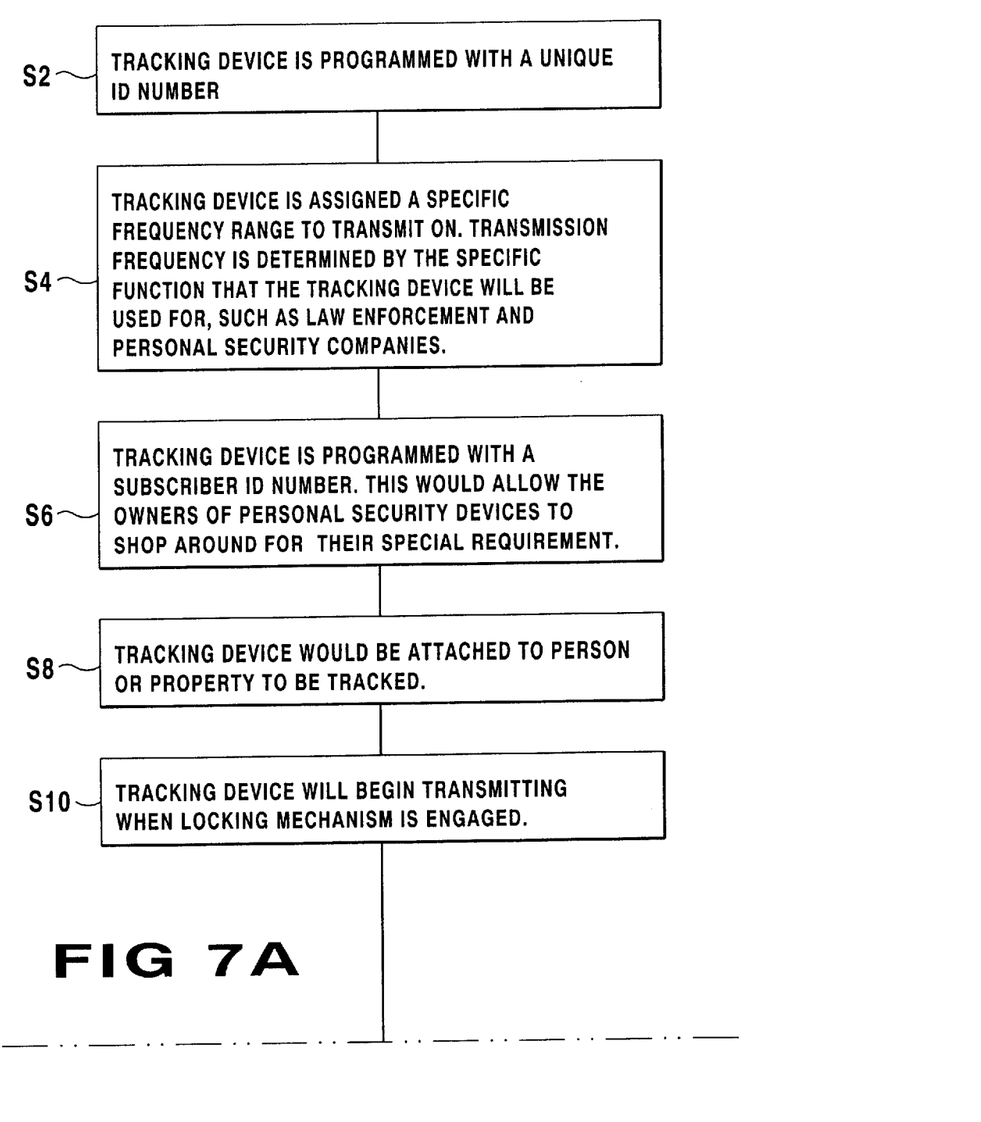
Figure 7B:
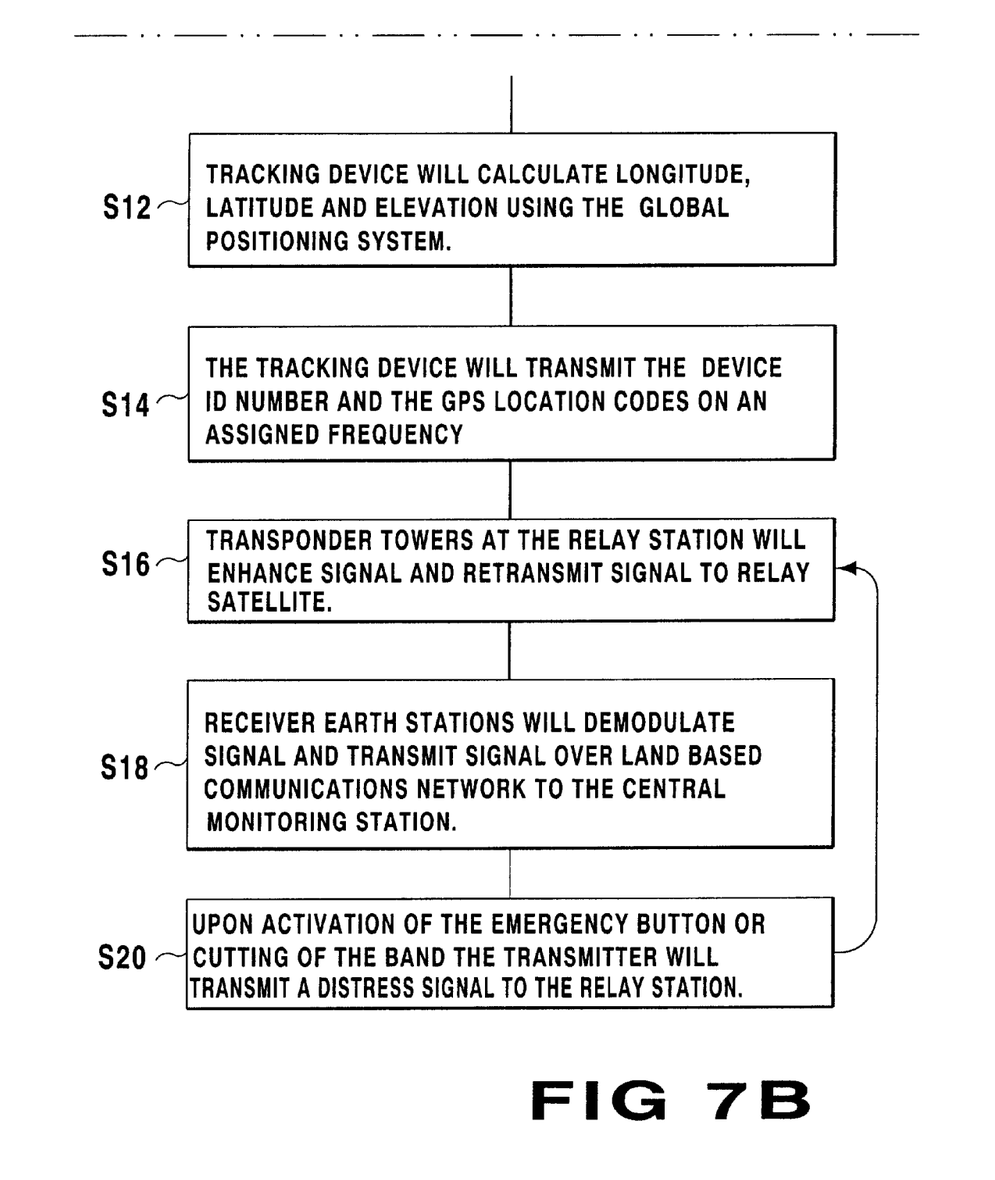

The operation of the global positioning and tracking system 10 will now be described with reference to the figures and specifically to the flow chart of FIG. 7. In operation, the tracking unit 18 is programmed with an identification code or number unique to the particular unit either upon manufacturing or using an external programming device connected to the input port connector as described in step S2. The tracking unit 18 is then assigned a specific frequency range at which it may transmit the identification signal along with any distress signals and location information as stated in step S4. The frequency is determined based upon the specific use of the particular tracking unit 18 such as for law enforcement, personal security companies, child protection or locating personal property and the particular frequency range at which the relay stations are set for receiving transmitted signals. The tracking unit 18 may also be programmed with a subscriber ID number, each specific subscriber number providing particular service to the individual devices as discussed in step S6. This allows users to find tracking devices that would suit their personal intended uses.

The tracking device is now ready for operation and is connected to the particular individual or piece of personal property to be tracked as described in step S8. This is done by locking the tracking unit 18 to complete the circuit extending therethrough. The tracking unit 18 will then begin transmitting an identification signal once the locking mechanism is engaged as stated in step S10. The longitudinal, latitudinal and elevational position of the tracking unit is continually calculated by the GPS logic circuit upon engagement of the locking mechanism as discussed in step S12. The tracking unit 18 continually transmits the positional signal and identification signal to the relay station 16 as stated in step S14. The relay station 16 then enhances the received signal and relays the transmitted positional and identification signals to the tracking satellite 14 as discussed in step S16. The tracking satellite then retransmits the enhanced positional and identification signals to the central monitoring station 12 as described in step S18. If it is detected that the band of the tracking device has been cut to open the circuit or the emergency button has been activated, the tracking unit 18 will automatically transmit a distress signal in the same manner as described above and stated in step S20.

Figure 10:
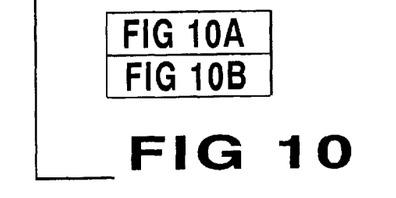
FIG. 10 is a flow chart illustrating the operating of the global positioning and tracking system of the present invention.
Figure 10A:
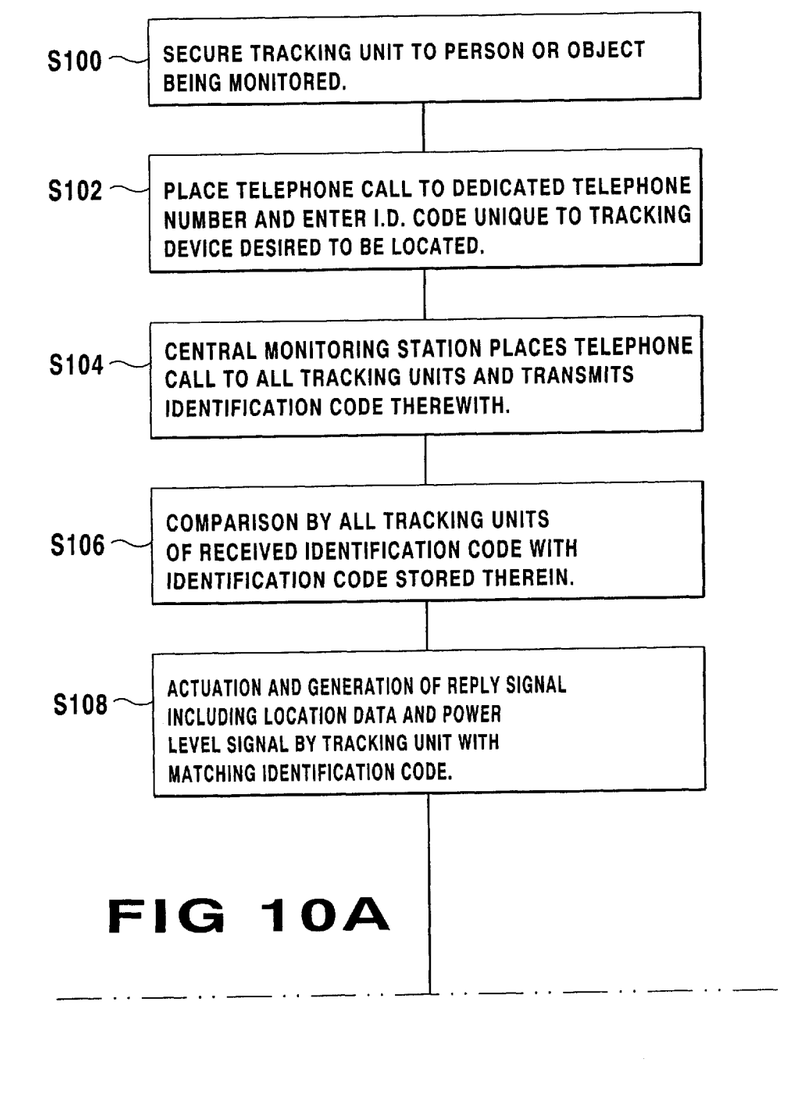
Figure 10B:
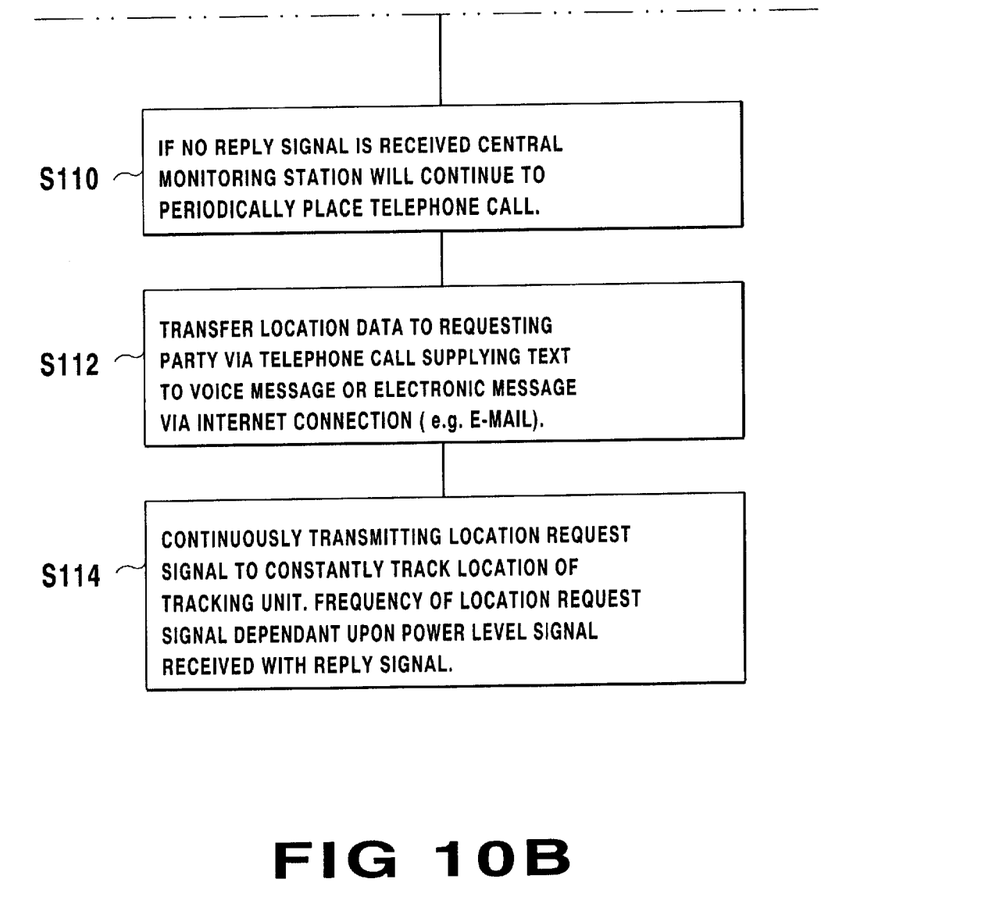

The operation of the global positioning and tracking system 100 illustrated in FIGS. 8 and 9 will now be described with specific reference to FIG. 10. In operation, the tracking unit 104 must be secured to an object or person who is being monitored thereby as described in step S100. Once the tracking device 104 is secured and turned on the system is ready for operation.

When it is desired to locate the person or object to which the tracking unit is secured, a person must place a telephone call to a dedicated telephone number and enter an identification code unique to the tracking unit 104 desired to be located as stated in step S102. The telephone call may be placed from any telephone or even through an Internet connection. When placing a location request through an Internet connection, the user must visit the web site dedicated for this purpose and enter the identification code as indicated on the web site or send an electronic message to a designated address. Upon receipt of the request by telephone or electronic message, the central monitoring unit 102 will place a telephone call via a second dedicated telephone number to all tracking units 104 as discussed in step S104. The telephone call will include a signal providing the identification code of the tracking unit 104 desired to be located. The telephone call will be received by all the tracking units 104 and the identification code transmitted therewith will be compared with the identification code stored in the individual tracking units 104 as described in step S106. The tracking unit 104 determining that the received identification code matches its internal identification code will be activated and transmit a reply signal via the established telephone channel as stated in step S108. The reply signal received from the tracking unit 104 will include location information related to the position of the tracking unit 104 and a sensed power level indicating the power level of the power supply within the tracking unit. If no reply signal is received within a predetermined period of time, the central monitoring station 102 will continue to periodically place the telephone call until a reply signal is received as discussed in step S110. The telephone call will be placed a predetermined number of times should no reply signal be received and after the predetermined number of attempts the placing of the telephone call will be discontinued.

Upon receipt of the reply signal, the central monitoring unit 102 will transmit the received location data to the user placing the request either through a telephone call or via an electronic message over an Internet connection. The method of transmission of the location data is dependent upon the method used to place the location request. If the request has been placed over a telephone call the response including location information will be transmitted using a text to voice message over a telephone call. If the request was placed by sending of an electronic message, the response will be in the form of an electronic message, e.g. e-mail, over the Internet. If an emergency signal was received at the central monitoring station, the central monitoring station 102 will transmit a location signal 144 to a public service answering point 146 closest to the location of the tracking unit 104 including information regarding the location of the tracking unit 104 and possibly information regarding the type of emergency. The public service answering point can then dispatch the appropriate emergency personnel to the location of the tracking unit 104 to attend to the emergency.

The central monitoring station 102 will continue to monitor the location of the tracking unit 104 by continuously transmitting location request signals. The frequency of transmission of the location request signals will be based upon the power level signal received with the reply signal from the tracking unit. As the tracking unit requires a larger amount of power to generate the reply signal than is needed during normal operation, the location request signals will be transmitted at intervals which will allow for maximum useful life of the power supply while not hampering the ability to adequately track the location fothe tracking device.

From the above description it can be seen that the global positioning and tracking system of the present invention is able to overcome the shortcomings of prior art devices by providing a global positioning and tracking system which is able to locate individuals and personal property anywhere around the world. The global positioning and tracking system including a transmitter/receiver for attachment around an individuals wrist or ankle which is operable in both a normal and standby mode and contained within a band made of an cut resistant material, preferably a high tensile strength plastic fiber or stainless steel, and is able to retain its cut resistant qualities while remaining small, attractive to wear and of a thickness which is not burdensome to the wearer. Each band of the global positioning and tracking system has an identification code unique to the particular band for identification and location purposes and an emergency button for transmitting a distress signal when the wearer is in need. Alternatively, the global positioning and tracking system is able to utilize existing cellular telephone technology to provide communication between the central monitoring unit and tracking units via a wireless telephone transmission for communicating with the central station and each tracking unit is able to receive a cellular telephone transmission from the central station and reply thereto with a position signal. The global positioning.and tracking system is also able to receive requests by individuals over telephone lines and Internet connections as to the location of particular tracking units. Furthermore, the global positioning and tracking system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A global positioning and tracking system for locating an object, said global positioning and tracking system comprising:
   a) a tracking device releasably secured to the object including:
      iv) a processing device for storing an identification code, determining a location of the tracking device and generating a position signal;
      v) a cellular receiver for receiving cellular transmissions to a telephone number specific to the at least one tracking device; and
      vi) a cellular transmitter for transmitting said position signal;
   b) a central monitoring station for receiving a location request and identification code from a user and initiating said cellular transmission including the identification code, wherein upon receipt of said cellular transmission and identification code said at least one tracking unit will compare the identification code with said stored identification code and upon determining said stored identification code matches said received identification code generating said transmitting said position signal to said central monitoring station via cellular transmission channels, said central monitoring station relaying said position signal to the user upon receipt; and
   c) a decorative face plate forming part of a wrist band within which said tracking device is mounted, said decorative face plate including first and second bands of rigid inflexible material extending from opposite sides of said face plate forming a loop for surrounding a portion of the object, the free end of one band including a pair of prong shafts for locking the first and second bands together, one of said bands having a hinged section extending from the free end thereof; wherein said processing device, cellular receiver and said cellular transmitter are embedded within said face plate; and a transmission wire extends from one end of said face plate through said first and second bands to the opposite end of said face plate for completing a circuit in said processing device so that when said first and second bands are apart said tracking unit is non-functional and when said first and second bands are engaged said tracking unit is functional, and said wrist band including the decorative face plate and bands being free of any electronic display, said device lacking any visible indication of its function.

2. The global positioning and tracking system as recited in claim 1, further comprising a plurality of tracking units, each tracking unit storing a unique identification code.

3. The global positioning and tracking system as recited in claim 2, wherein said plurality of tracking units are all assigned a general telephone number for receiving communications from said central monitoring station.

4. The global positioning and tracking system as recited in claim 3, wherein said central monitoring station includes a data base for storing identification codes of all of said plurality of tracking devices, said central monitoring station comparing said identification codes received with the location request to said identification codes stored in said data base for determining if an identification code received with a location request is valid prior to initiating a cellular transmission.

5. The global positioning and tracking system as recited in claim 3, wherein said processing means of each of said plurality of tracking devices further includes a memory for storing said unique identification code.

6. The global positioning and tracking system as recited in claim 3, wherein each of said plurality of tracking devices includes a means for generating a distress signal for transmission to said central monitoring station upon detection of an emergency situation.

7. The global positioning and tracking system as recited in claim 6, wherein each of said plurality of tracking devices further includes a switch for activating said means for generating a distress signal.

8. The global positioning and tracking system as recited in claim 1, wherein the user is able to provide a location request to said central monitoring station by at least one of a telephone communication and an electronic message via an Internet connection.

9. The global positioning and tracking system as recited in claim 8, wherein said central monitoring station will provide said position signal to the user as a voice message when said location request is provided via a telephone communication.

10. The global positioning and tracking system as recited in claim 8, wherein said central monitoring station will provide said position signal to the user as an electronic message over an Internet connection when said location request is provided via an electronic message.

11. The global positioning and tracking system as recited in claim 1, wherein said at least one tracking device is made of at least one of high tensile strength plastic fiber and stainless steel.

* * * * *